United States Patent
Agrawal et al.

(10) Patent No.: US 7,702,617 B2
(45) Date of Patent: Apr. 20, 2010

(54) SYSTEM AND METHOD FOR DISTRIBUTED QUERYING AND PRESENTATION OF INFORMATION FROM HETEROGENEOUS DATA SOURCES

(75) Inventors: Rakesh Agrawal, San Jose, CA (US); Amit Somani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1978 days.

(21) Appl. No.: 10/286,300

(22) Filed: Oct. 31, 2002

(65) Prior Publication Data

US 2004/0088174 A1 May 6, 2004

(51) Int. Cl.
*G06F 7/00* (2006.01)
*G06F 17/30* (2006.01)

(52) U.S. Cl. .............................. 707/3; 707/10; 709/203
(58) Field of Classification Search ................. 707/1–3, 707/10; 705/26–27, 500; 709/210–203, 709/217–219
See application file for complete search history.

(56) References Cited

U.S. PATENT DOCUMENTS

| | | | | |
|---|---|---|---|---|
| 5,600,831 | A * | 2/1997 | Levy et al. ...................... | 707/2 |
| 6,038,668 | A | 3/2000 | Chipman et al. | |
| 6,078,914 | A * | 6/2000 | Redfern .......................... | 707/3 |
| 6,085,186 | A * | 7/2000 | Christianson et al. .......... | 707/3 |
| 6,108,686 | A | 8/2000 | Williams, Jr. | |
| 6,421,675 | B1 * | 7/2002 | Ryan et al. ................... | 707/100 |
| 6,826,553 | B1 * | 11/2004 | DaCosta et al. ................ | 707/1 |
| 6,910,128 | B1 * | 6/2005 | Skibbie et al. .............. | 713/170 |
| 7,010,500 | B2 * | 3/2006 | Aarnio ......................... | 705/26 |
| 2001/0054090 | A1 * | 12/2001 | Jung et al. ................... | 709/219 |
| 2002/0165856 | A1 * | 11/2002 | Gilfillan et al. ................ | 707/3 |
| 2003/0041263 | A1 * | 2/2003 | Devine et al. ............... | 713/201 |
| 2003/0079052 | A1 * | 4/2003 | Kushnirskiy ................ | 709/328 |
| 2004/0027349 | A1 * | 2/2004 | Landau et al. .............. | 345/440 |
| 2004/0068486 | A1 * | 4/2004 | Chidlovskii .................... | 707/3 |
| 2004/0088174 | A1 * | 5/2004 | Agrawal et al. ................ | 705/1 |
| 2007/0208697 | A1 * | 9/2007 | Subramaniam et al. ........ | 707/3 |

OTHER PUBLICATIONS

"X.509 Certificates and Certificate Revocation Lists (CRLs)", as presented on the web at http://java.sun.com/com/products/jdk/1.2/docs/guide/security/cert3.html, 5 page article dated May 20, 1998.
"Security", as presented on the web at http://java.sun.com/products/jdk/1.2/docs/guide/security/index.html, 2 page article printed Sep. 17, 2002.

* cited by examiner

Primary Examiner—Luke S. Wassum
Assistant Examiner—Susan F Rayyan
(74) Attorney, Agent, or Firm—Jeffrey T. Holman

(57) ABSTRACT

A method, system, business method, and computer program product for retrieving and organizing networked data, wherein fetch rules and extraction rules enable a user to automatically collect and extract information from a remote network site. The fetch rules reproduce the interaction a client executes if interacting directly with the remote site, so a server cannot be shut out. The extraction rules allow the client, preferably via an applet, to glean relevant information from the acquired pages for presentation in a general interface. As an electronic commerce business method, information about remote site responsiveness, fetch rules, and extraction rules may be shared between server and client for a fee. The server accumulates vendor contacts, stores query rules, and provides common interface rules. The invention can gather statistics on vendor responsiveness and can resell information to vendors or others.

24 Claims, 1 Drawing Sheet

SYSTEM AND METHOD FOR DISTRIBUTED QUERYING AND PRESENTATION OF INFORMATION FROM HETEROGENEOUS DATA SOURCES

FIELD OF THE INVENTION

This invention relates to client-server computing, and more specifically to automated querying of heterogeneous data sources and presentation of query results via a common interface.

BACKGROUND OF THE INVENTION

Client-server computing has been the dominant computing paradigm for the last several years. With the advent of the World Wide Web, client-server computing has been manifested in the form of remote site servers supporting databases of information, and client-side applications (like web browsers) querying the remote site servers and presenting the results to a user. This is how most of the Web looks today.

A new class of applications has been developing recently, designed to help database owners make their information more accessible from the Web. For example, if a design engineer wants to find information such as price and availability for components they are considering for a circuit board, manufacturers of such components have a strong incentive to employ applications that connect their databases to the Web. However, the query interface offered by each such manufacturer is typically different, with many requiring several levels of navigation before the desired query page is reached. Also, the results of user queries are often presented in different formats on a particular Web page. Therefore, the exemplary design engineer would typically visit some of the manufacturers' web sites, query them, and save the results manually for later (and possibly tedious) comparison.

As an improvement over the above approach, vertical portals and electronic marketplaces have sprung up, offering consolidated information to simplify the search. Examples include Chipcenter (www.chipcenter.com), E2open (www.e2open.com), Questlink (www.questlink.com), and Free Trade Zone (www.freetradezone.com). These tools crawl, extract, and index information from the various web data sources (e.g. component manufacturers and distributors) periodically, and then publish the information for various web clients. This approach has the disadvantages that the information at the portal is often stale, the data sources may shut out the portal from collecting the information, and centralized remote site servers have inherent reliability and scalability cost issues associated with them.

Some agent-based systems have been designed to address some of the above concerns. Examples include the Jango shopping agent of Excite.com (www.jango.com) and Pricing Agent of Half com (www.half.com). In these systems, in response to a user request, the central server spawns agents that crawl to the remote data sources, collect information, and then the server finally presents the information to the user. Note that the involvement of the client computer is minimal in these systems, as most of the work happens on the server side. The agents run with the server identity, and hence can be shut out by data resources easily.

The following U.S. Patents describe related systems: U.S. Pat. No. 6,038,668 to Richard R. Chipman et al. (referred to hereafter as Chipman) and U.S. Pat. No. 6,108,686 to Henry R. Williams, Jr. (referred to hereafter as Williams). Chipman describes the use of a predefined common language (e.g. HTML) and format for organizing information placed on a network of computers. A portal maintains a list of HTML pages at each supplier's site that comply to the predefined constraints. Chipman contemplates that each industry sector will have at least one governing portal from which all other portals in that industry derive their common vocabulary, taxonomy or ontology. For example, one might perhaps employ DTDs (Document Type Definitions) with XML based systems, so that everyone uses standard forms for purchases. However, this system has many shortcomings. Vendors may not necessarily be willing to cooperate with this scheme as it requires a great deal of labor to organize information for a so-called governing portal that would tend to promote selling by price alone. Large vendors in particular may prefer to present their data as they see fit. The Chipman system is not flexible enough to do things that non-compliant vendors may want to do, i.e. it is not able to deal with less than strict compliance with predefined constraints. Chipman discloses that consumers can supply data to the portal for re-supply to other consumers, but there's no guarantee that such data will be accurate. Finally, Chipman provides no means for acquiring rules that describe how a client can gather information from a remote site; individual consumers must either acquire the information directly or determine such rules manually.

Williams enables a user to define a unique set of search rules for locating information and retrieving documents. The search rules (which are subject or keyword based) are provided to a search agent that then automatically accesses content in remote databases according to the search rules. The Williams system stores the acquired information in a local database using the same organizational structure in which the information was stored in the remote database. Users can then run queries against the local database contents to manually extract interesting features.

SUMMARY OF THE INVENTION

It is accordingly an object of this invention to provide a method for retrieving and organizing networked data wherein fetch rules and extraction rules enable a user to automatically collect and extract information from a remote network site. The fetch rules reproduce the interaction a client executes if interacting directly with the remote site, so, unlike search agents, a server cannot be shut out. The extraction rules allow the client, preferably via a Java applet, to glean relevant information from the acquired pages for presentation to the client in a general interface.

It is a related object of the invention to provide a method of conducting electronic commerce wherein information about remote site responsiveness, fetch rules, and extraction rules may be shared between server and client for a fee. The server accumulates vendor contacts, stores query rules, and provides common interface rules. The invention can gather statistics on vendor responsiveness and can resell information to vendors or others.

The foregoing objects are believed to be satisfied by the embodiment of the present invention as described below.

DETAILED DESCRIPTION OF THE INVENTION

Figure 1:
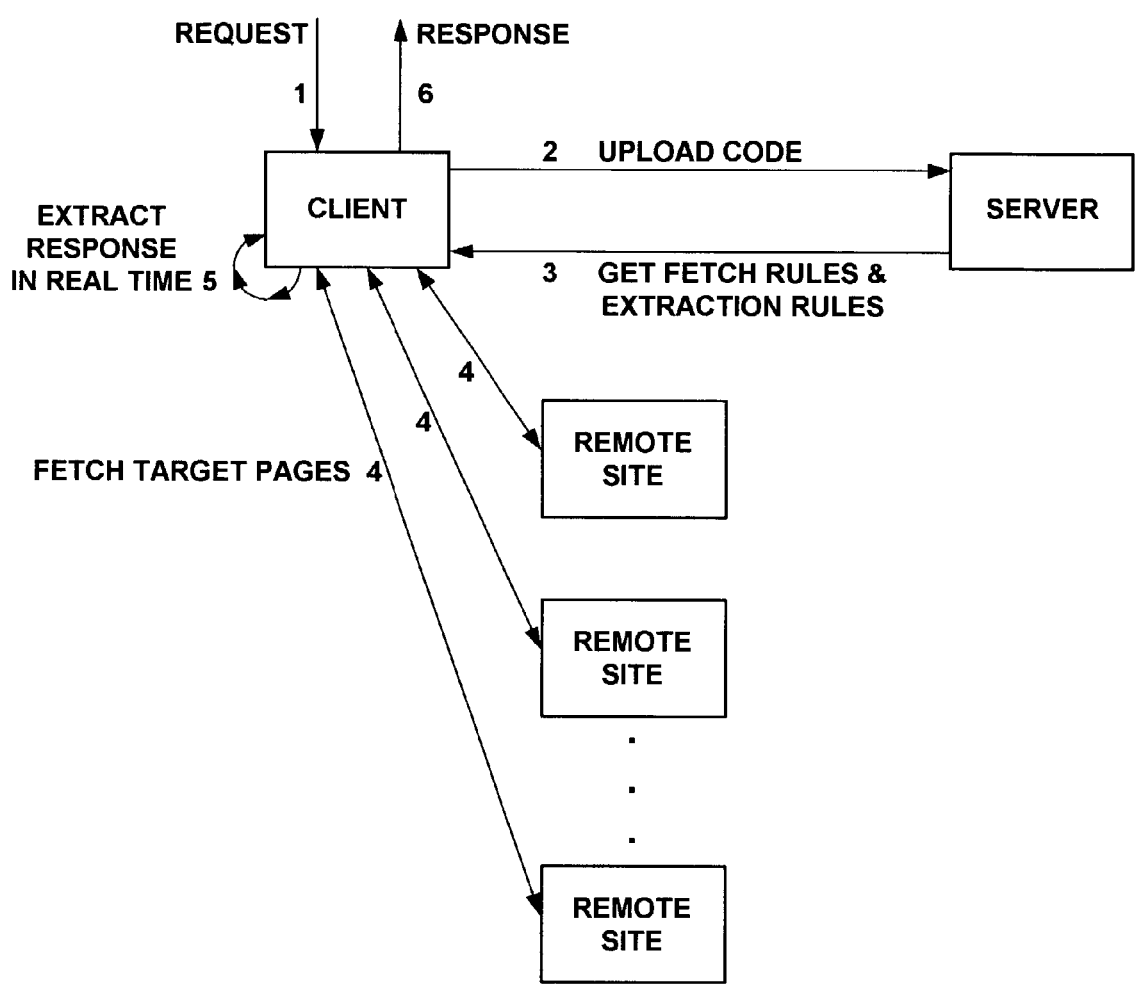
FIG. 1 is a diagram of the system components and method steps according to the preferred embodiment of the present invention.

Referring now to FIG. 1, an overview of the invention is shown. The FIGURE depicts the system components and the method steps the components execute in an exemplary sequential flow diagram. The major steps performed by the method are numbered and labeled to indicate the general order of operations and transfer of information between the system components. The system components of a preferred embodiment include a client, at least one server, a communications link between the client and the server, and a Java applet. Only one instance of a server is shown for clarity, but multiple servers may be employed to enhance the reliability and scalability of the system.

Any type of communications link between the client and the server will suffice, but the invention is quite amenable to use with the World Wide Web and its associated communications protocols as are well known in the art. The client and the server are preferably capable of performing their tasks with sufficient speed that a user of the invention would perceive the invention as operating in substantially real time. The client is preferably a web browser having a built-in run-time Java environment (Java Virtual Machine or JVM); such browsers are well known in the art. The client may execute on a user's computer for example or on any remote computer to which a user has electronic access. The remote sites shown in FIG. 1 are data sources accessible by the client; the remote sites may include for example auction sites or vendor web pages described by URLs (essentially WWW addresses), or may include nodes or directories in a non-Internet network.

The method of the invention begins when a user originates at least one data request and submits it to the client, shown as event number 1 in FIG. 1. The user's input may include for example query terms or combinations of query terms, keywords describing remote sites likely to have data satisfying the data request, and specific remote sites to be searched. The client then transmits the user's input to the server along with user metadata, which generally is information that will enable the applet to identify itself as a specific user when acquiring data so that remote sites will not be able to determine that the user is not accessing their information directly. Many remote sites can detect automated anonymous access attempts and specifically limit or refuse access to web crawlers or user agent programs behind the attempts. The present invention is intended to bypass such access limitations. User metadata can include userids, passwords, account numbers, email addresses, and URLs.

The client then preferably directly transmits the data request to the server via the communication link, shown as event number 2 in FIG. 1. A typical data request might be for stock market data or accounting data described in periodic reports filed by public companies and mutual funds. For example, a user might want to know the annual revenue for the IBM Corporation for the year 2001. Company reports are good data sources for such requests. Other data requests might require database queries, as for example are used in travel reservation systems for airlines and hotels. A user might want purchasing data for a potential transaction, for example, to determine the price of an item given a description or part number and shipping preferences for a number of vendors. Vendor catalogs are good data sources for these requests. Electronic parts vendors are likely to be interested in making vast amounts of data on their components available in a readily manageable form, so that not only price but other information types are distinguished and considered by purchasers. Some vendors might employ the invention to fulfill data requests designed to identify other vendors' remote sites, the data provided on those sites, and the format of that data.

Next, the server processes the data request to select a set of fetch rules and a set of extraction rules from its storage corresponding to remote sites that are likely to have data that will satisfy the data request, as shown in event 3 in FIG. 1. Fetch rules are a set of declarative rules that allow the applet to mimic the interaction that users would have with remote sites if they were to interact directly with the remote sites in order to navigate the result pages containing useful data. For example, the fetch rules may specify a particular navigation trajectory through a series of web pages or file directories, particular data entries to be made or other interface actions required, and to then select the newest or largest file found at a particular location. Extraction rules are a set of declarative rules that allow relevant information to be extracted from data acquired from the remote sites. Such acquired data is often in the form of target web pages. The server typically stores a set of fetch rules and a set of extraction rules for all remote sites with which it interacts, and may perform supervised learning based on the content a user wants in order to develop rules on its own without having to do this manually. The server is in some sense an expert system for facilitating querying across heterogeneous data sources.

The server then creates an applet based on the data request, the fetch rules, the extraction rules, and user metadata. The server preferably signs the applet with a digital X.509 certificate and transmits the applet back to the client. An X.509 certificate is a type of public key certificate, which is a digitally signed statement from one entity, saying that the public key (and some other information) of another entity has some specific value. More information about X.509 certificates can be found on the World Wide Web at java.sun.com/products/jdk/1.2/docs/guide/security/cert3.html which is hereby incorporated by reference. Java applets can have multiple levels of security: "high", "medium", "low" and "untrusted". More information about applet security can be found on the World Wide Web at java.sun.com/products/jdk/1.2/docs/guide/security/index.html which is hereby incorporated by reference. The default is for an applet to be "untrusted"; such an applet is not allowed to read or write files on a user's computer, open sockets to machines other than where it was downloaded from, or read or write system properties. However, by granting a signed applet various access privileges, the user is in effect allowing the code to work as if it were a program that was installed explicitly on the user's machine, without the hassle of actually installing the application. The present invention enables remote querying by use of such a signed applet. The client authenticates the applet from the server. The user then indicates to the client that the signed applet is allowed to open connections to the remote sites (the exact granularity of the security level requested is determined by the Java security model that the browser implements). This indication is required only once per session.

Once the applet is running in secure mode, preferably on the client, it communicates with the remote sites as shown in events 4 of FIG. 1. The server acquires data from at least one remote site using the query strings describing the data request, and user metadata and fetch rules that enable it to access the remote site just as the user would. Any number of remote sites may be accessed concurrently by the applet in the preferred embodiment, substantially in real time. The acquired data may be particular web pages or the results of queries, for example. To the remote site, the queries, navigation commands, and other inputs appear as if they were generated by a user who is navigating the site directly. The remote site therefore cannot shut out or limit access by the applet.

Next, the applet employs the extraction rules from the server to extract information relevant to the data request from the acquired data. This step is shown as event 5 in FIG. 1. Note that the client that preferably executes the applet is doing nearly all the computational work; the server provides the rules describing how to get data and digest it, but does not necessarily process the data itself. The server can therefore be very 'thin', and consequently can handle many data requests from many different clients reliably since each is not terribly computationally intensive. The server may charge each client a fee for the information it provides, e.g. the fetch rules and the extraction rules, along with other expertise it may develop. There are other advantages of having the client performing most of the computational work of the invention. For example, when the users (data requesters) know they are in charge of the operation, their trust in the invention and its ability to process queries over heterogeneous data sources increases. Also, by providing focused user interaction and 'instant gratification' in terms of satisfying data requests in substantially real time, the invention can increase immediate sales for those vendors who choose to make their data available.

Once the applet has extracted information relevant to the data request from all the remote sites, the applet consolidates the information and presents the information to the user, typically using a web browser's graphical user interface. Generation of the response to the data request is shown as event 6 in FIG. 1. Consolidation may include for example assembling answers to a purchasing related inquiry from multiple vendors into a single column or table. Alternately, responses to queries from different search engines may be ranked according to known ranking algorithms. The applet may apply a set of presentation rules associated with a data request, so that consolidated information is presented to the user in accordance with desired formatting.

The invention may also perform some additional steps. For example, the applet can gather information about the various remote sites it contacts as it tries to satisfy data requests. If a remote site is unavailable for example because of network outages or obsolete address information, the server operator would probably like to know this, therefore the applet could transmit such information to the server. The server (or client) would then determine if alternate remote site addresses are available for that particular data supplier, and alter or update its fetch rules accordingly. Similarly, if a remote site is available but is providing data very slowly for some reason, this level of responsiveness is also information that would be valuable to the server. The applet could transmit acquired data to the server for use in providing cached versions of the data to other originators of data requests. In another example, if the applet determines that the extraction rules needed to glean relevant information from such data are ineffective, the applet can inform the server that the extraction rules are obsolete and in need of updating. If the server has no fetch rules or extraction rules for a given remote site, the client may provide these for a fee. Similarly, the client can provide extracted information, consolidated extracted information, and presentation rules to the server for a fee.

The client therefore could become a reseller of any information acquired by the applet. Exchange of information facilitating distributed heterogeneous querying could thus form the basis of a method of conducting electronic commerce. The server and client may charge each other or provide discounts to their regular charges in return for exchanged data. Alternately, the server or the client could resell such information to third parties as a business method. For example, one vendor might be willing to pay to be informed when a competing vendor's remote site crashes or when a major change in a competitor's pricing strategy is detected.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for distributed querying of heterogeneous data sources, comprising:
    transmitting at least one data request from a client to at least one server;
    creating a signed applet at the server based on the data request from the client and fetch rules and extraction rules stored by said server;
    executing said signed applet on the client, said signed applet configured to:
        acquire data from at least one remote site using said fetch rules; and
        extract information from said acquired data using said extraction rules;
        wherein said data request includes user metadata enabling said signed applet to mimic a user by performing automated interactions which imitate user-controlled interactions between the client and the remote site to appear as if a user were navigating the remote site directly and thus prevent said remote sites from restricting automated access.

2. The method of claim 1, wherein executing said signed applet further comprises consolidating said extracted information from multiple remote sites and presenting said extracted information according to presentation rules.

3. The method of claim 1, wherein executing said signed applet further comprises gathering statistics on utility of particular remote sites in satisfying particular data requests.

4. The method of claim 3, wherein executing said signed applet further comprises transmitted said extracted information to said server.

5. The method of claim 4, further comprising updating at the server said extraction rules for particular remote sites.

6. The method of claim 3, wherein executing said signed applet further comprises transmitting said acquired data from the client to said server.

7. The method of claim 6, further comprising updating at the server said fetch rules for particular remote sites.

8. The method of claim 1, wherein said method executes in substantially real time.

9. The method of claim 1, wherein executing said signed applet further comprises:
    monitoring an effectiveness of said extraction rules; and
    communicating the effectiveness of said extraction rules to the server.

10. The method of claim 1, wherein executing said signed applet further comprises:
  monitoring a level of responsiveness of at least one of the remote sites; and
  communicating the level of responsiveness of the at least one remote site to the server.

11. A method for conducting electronic commerce, comprising the steps of:
  transmitting at least one data request from a client to at least one server;
  creating a signed applet at the server based on the data request from the client and fetch rules and extraction rules stored by said server;
  executing said signed applet, said signed applet acquiring data from at least one remote site using said fetch rules and extracting information from said acquired data using said extraction rules,
  wherein said server charges a data request originator for using at least one of said rules;
  wherein said data request includes user metadata for said signed applet to mimic a particular data request originator by performing automated interactions which imitate user-controlled interactions between the client and the remote site to appear as if a user were navigating the remote site directly and thus prevent said remote sites from restricting automated access.

12. The method of claim 11, further comprising crediting said data request originator from said server for exchanged data including at least one of: said user metadata, said fetch rules, updated fetch rules, said acquired data, said extraction rules, updated extraction rules, extracted information, consolidated extracted information, presentation rules for said extracted information, statistics on the utility of particular remote sites in satisfying said data requests, alternate remote sites likely to satisfy said data requests.

13. The method of claim 12, wherein said server discounts said charges to said data request originators in return for said exchanged data.

14. The method of claim 11, wherein said data request originator charges third parties for exchanged data including at least one of: said user metadata, said fetch rules, updated fetch rules, said acquired data, said extraction rules, updated extraction rules, extracted information, consolidated extracted information, presentation rules for said extracted information, statistics on the utility of particular remote sites in satisfying said data requests, and alternate remote sites likely to satisfy said data requests.

15. The method of claim 11, wherein said data request originator is one of said remote sites, identifying other remote sites, data provided by said other remote sites, and the format of said data provided by said other remote sites.

16. The method of claim 11, wherein said data request originator seeks information from at least one of: company reports, databases, and catalogs.

17. The method of claim 10, wherein a web browser transmits said data request.

18. The method of claim 11, wherein executing said signed applet further comprises:
  consolidating said extracted information from multiple remote sites; and
  presenting said extracted information according to presentation rules.

19. A system for distributed querying of heterogeneous data sources, comprising:
  means for transmitting at least one data request from a client to a server;
  means for creating a signed applet at the server based on the data request from the client and fetch rules and extraction rules stored by said server; and
  means for executing said signed applet on the client, said signed applet comprising:
    means for acquiring data from at least one remote site using said fetch rules; and
    means for extracting information from said acquired data using said extraction rules;
  wherein said data request includes user metadata for said signed applet to mimic a particular data request originator by performing automated interactions which imitate user-controlled interactions between the client and the remote site to appear as if a user were navigating the remote site directly and thus prevent said remote site from restricting automated access.

20. A computer program product for distributed querying of heterogeneous data sources, the computer program product comprising:
  a computer readable storage medium having computer readable program code embodied therewith, the computer readable program code comprising:
    a first program code instruction to transmit at least one data request from a client to a server;
    a second program code instruction to create a signed applet at the server with fetch rules and extraction rules stored by said server, said signed applet further comprising:
      a third program code instruction for acquiring data from at least one remote site using said fetch rules; and
      a fourth program code instruction for extracting information from said acquired data using said extraction rules;
    wherein said data request includes user metadata for said signed applet to mimic a particular data request originator by performing automated interactions which imitate user-controlled interactions between the client and the remote site to appear as if a user were navigating the remote site directly and thus prevent said remote site from restricting automated access.

21. A system for distributed querying of heterogeneous data sources, the system comprising:
  a client;
  a server; and
  a communications link between said client and said server;
  wherein said server is configured to receive at least one data request from said client, to create a signed applet with stored fetch rules and stored extraction rules, and to return said signed applet to said client for execution;
  wherein said client is configured to execute said signed applet to acquire data from at least one remote site using said fetch rules and to extract information from said acquired data using said extraction rules;
  wherein said data request includes user metadata for said signed applet to mimic a particular data request originator by performing automated interactions which imitate user-controlled interactions between the client and the remote site to appear as if a user were navigating the remote site directly and thus prevent said remote site from restricting automated access.

22. The system of claim 21, wherein said client is a web browser having a built-in run-time Java environment.

23. The system of claim 21, wherein said signed applet consolidates and presents said extracted information.

24. The system of claim 21, wherein said client is a remote computer.

* * * * *